United States Patent [19]

Peignier et al.

[11] Patent Number: 4,525,515

[45] Date of Patent: Jun. 25, 1985

[54] STORAGE-STABLE, PUMPABLE CONCENTRATED SUSPENSIONS OF WATER-SOLUBLE POLYMERS

[75] Inventors: Michel Peignier, Versailles; Claude Renault, Le Conquet, both of France

[73] Assignee: Rhone-Poulenc Specialites Chimiques, Courbevoie, France

[21] Appl. No.: 516,846

[22] Filed: Jul. 25, 1983

[30] Foreign Application Priority Data

Jul. 30, 1982 [FR] France ................. 82 13318

[51] Int. Cl.$^3$ .......................... C08K 5/05; C08K 5/13; C08L 5/00; C08L 33/26
[52] U.S. Cl. ................................. 524/378; 106/170; 106/208; 106/213; 106/238; 524/922
[58] Field of Search .............. 106/170, 208, 213, 238; 524/378, 922

[56] References Cited

U.S. PATENT DOCUMENTS

| | | | |
|---|---|---|---|
| Re. 28,474 | 7/1974 | Anderson et al. | 523/336 |
| 2,389,796 | 11/1945 | Mack | 523/336 |
| 2,992,198 | 7/1961 | Funahashi | 524/313 |
| 3,006,880 | 10/1961 | Schibler et al. | 524/376 |
| 3,763,071 | 10/1973 | Katzer et al. | 524/386 |
| 3,894,880 | 7/1975 | Colegrove | 106/208 |
| 3,960,584 | 6/1976 | Savage | 524/922 |
| 4,012,354 | 3/1977 | Paul | 524/922 |
| 4,021,399 | 5/1977 | Hunter et al. | 523/335 |
| 4,048,079 | 9/1977 | Clampitt et al. | 106/208 |
| 4,146,499 | 3/1979 | Rosano | 523/339 |
| 4,155,314 | 5/1979 | O'Callaghan et al. | 106/208 |
| 4,176,107 | 11/1979 | Buckman et al. | 524/377 |
| 4,363,669 | 12/1982 | Cottrell et al. | 106/208 |
| 4,393,151 | 7/1983 | Dawans et al. | 523/130 |

Primary Examiner—Ronald W. Griffin
Attorney, Agent, or Firm—Burns, Doane, Swecker & Mathis

[57] ABSTRACT

Storage-stable, pumpable, concentrated polymer suspensions, well adapted for use as thickening and flocculating agents, are comprised of (i) a water-soluble polymer, (ii) at least one water-soluble surfactant, and (iii) water, the amount of water being less than about 30% by weight of the total weight thereof.

17 Claims, No Drawings

STORAGE-STABLE, PUMPABLE CONCENTRATED SUSPENSIONS OF WATER-SOLUBLE POLYMERS

BACKGROUND OF THE INVENTION

1. Field of the Invention

The present invention relates to concentrated, pumpable suspensions of water-soluble polymers, the preparation thereof and utilization of same as thickening agents for aqueous media.

2. Description of the Prior Art

Synthetic and natural organic polymers that dissolve or disperse in water and which, by dissolving or dispersing in water, display thickening or flocculating properties, are known to have widespread industrial applications in the construction, paint, paper, textile, cosmetic, and food industries, and in waste-water treatment, phytochemistry, drilling, assisted oil recovery, and the like.

In many applications, these polymers or hydrocolloids must be employed in the form of a low-concentration aqueous solution or dispersion. It is also known that the major disadvantage of most water-soluble polymer powders is that they are difficult to rapidly dissolve without using methods of high shear agitation. Under the influence of overly rapid hydration, the polymer particles swell when they come into contact with water and tend to form flocs resulting from agglomeration of the particles. These flocs are coated with a thin film, resulting in the formation of gel on the outer surfaces thereof, and same disaggregate and dissolve only with difficulty.

To facilitate dissolution of water-soluble polymers of the polyacrylamide type, there have been proposed to this art various water-in-oil emulsions that undergo phase inversion by adding water containing a surfactant thereto. However, these emulsions are not very stable and tend to separate into two phases during storage.

Solutions having varying concentrations of polymer have also been proposed to this art. Formulations of this type are disclosed in U.S. Pat. Nos. 3,763,071, 3,894,880 and 4,176,107, for example.

SUMMARY OF THE INVENTION

Accordingly, a major object of the present invention is the provision of improved compositions based upon a water-soluble polymer, in the form of concentrated suspensions that are stable when stored up to temperatures of approximately 50° C., that can easily be pumped, that are easy to use in an industrial environment and that disperse quite readily in water without the need for sophisticated machinery apparatus therefor.

Briefly, the suspensions according to the invention comprise a particulate, water-soluble polymer, at least one water-soluble surfactant, and water in a proportion of less than 30% by weight relative to the mixture.

DETAILED DESCRIPTION OF THE INVENTION

More particularly according to the present invention, by the term "water-soluble polymer" there is intended any polymer which can be solvated or dispersed in an aqueous system and which, by solvation or dispersion, acquires thickening or flocculating properties. Said term "water-soluble polymer" includes synthetic and natural polymers, natural gums, modified natural gums and mixtures thereof.

The water-soluble synthetic polymers are widely described in the literature. For instance, reference is made to the text by Davidson and Sitting entitled *Water-Soluble Resins,* Rheinhold Book Corporation (1968). From this class of polymer, it is preferable to employ polymers and copolymers of the polyacrylamide and polymethacrylamide type having a high molecular weight. The following are more specifically representative:

(i) Acrylamide homopolymers;
(ii) Anionic copolymers comprised of an acrylic acid salt and acrylamide;
(iii) Cationic copolymers comprised of acrylamide and a cationic monomer, sich as trimethylammoniumethylmethacrylate chloride;
(iv) Cationic homopolymers comprised of cationic monomers;
(v) Anionic homopolymers comprised of acrylic acid and salts thereof.

These homopolymers and copolymers may be prepared according to the processes disclosed, for example, in published French patent applications Nos. 2,348,227, 2,428,054 and 2,453,185.

The natural water-soluble polymers are also widely described in the literature, e.g., Whistler, *Industrial Gums,* 2nd Edition, Academic Press (1973). More particularly, natural gums of the galactomannan group are exemplary, such as guar, carob and Tara gums, gum arabic, algin (sodium alginate); natural modified gums, such as the cellulose derivatives, for example, carboxymethylcellulose, alkyl and hydroxyalkylcelluloses, carboxymethylhydroxyethylcellulose; starch derivatives obtained by substituting a proportion of the hydroxyl groups with acetate, hydroxyethyl, hydroxypropyl, sulfate, phosphate groups. Also belonging to this category of natural polymers are the polysaccharides of microbial origin, such as Xanthan gum.

The surfactants suitable for use for producing the stable pumpable solutions according to the invention may be of anionic, cationic, non-ionic or amphoteric type. The surfactant must be water-soluble and must possess good wettability. Its HLB value must be greater than or equal to 10. It must be fluid at ambient temperature and inert relative to the polymer.

In selecting the surfactant, reference is made to Kirk Othmer, *Encyclopedia of Chemical Technology,* Vol. 19 or to the *Surfactant Series* published by Marcel Drekker: Schick, *Non-Ionic Surfactants,* Vol. 1; Jungerman, *Cationic Surfactants,* Vol. IV; Linfield, *Anionic Surfactants,* vol. VI.

As the anionic surfactant, the following are exemplary: alkaline salts of carboxylic acids, sulfonates such as alkyl- and/or aryl-sulfonates, sulfosuccinates, sulfates and sulfate derivatives such as alkylsulfates, sulfated alcohols, sulfated polyglycolic ethers, phosphate derivatives such as phosphated ethoxylated alcohols.

Among the cationic surfactants, .the following are representative: ethoxylated mono-, di- and polyamines, ethoxylated amido-amines and ethoxylated quaternary ammonium salts.

As the non-ionic surfactants, compounds obtained by condensation of an alkylene oxide with an aliphatic or alkylaromatic organic compound are generally exemplary. Suitable surfactants are polyoxyethylated alkylphenols, polyoxyethylenated alcohols, polyoxyethylenated fatty acids, polyoxyethylenated triglycerides, polyoxyethylenated and polyoxypropylenated derivatives. Within this class of surfactants, preferred are condensation products of nonylphenol and ethylene oxide comprising an average of 9 to 16 moles of ethylene oxide, and condensation products of $C_8$–$C_{18}$ aliphatic alcohols with about 6 to 15 moles of ethylene oxide.

All of the foregoing surfactants may be employed either alone or in combinations thereof. It is apparent that the type of surfactant shall be selected as a function of the type of polymer and the specific intended application.

The suspensions or dispersions formed in accordance with the invention contain approximately 20 to 75% by weight of polymer. In general, the relative proportions expressed in weight of polymer and surfactant may range from approximately 20–90/80–10. These proportions are a function, on the one hand, of the type and granulometry of the polymer and, on the other hand, of the viscosity of the surfactant. Advantageously, the relative proportions range from 30–70/70–30. The preferred content ranges from 40 to 55% for the polymer and 60 to 45% for the surfactant.

In addition to the polymer and the surfactant, it is essential that the formulation contain a certain amount of water. The water may be totally or partially contained or comprised in the surfactant and/or in the polymer. If the quantity of water is insufficient, the suspension will separate into two phases. If the quantity of water is excessive, the suspension's viscosity will be excessive. The appropriate quantity of water may be determined in each specific case by performing a few simple preliminary tests, by making a mixture of the polymer and surfactant, then adding increasing quantities of water until a stable suspension is obtained.

In general, to obtain a concentrated, stable solution that can be pumped, the quantity of water must be less than or equal to 30% by weight relative to the total mixture. Preferably, the suspensions contain less than 15% water relative to the total mixture and from 5 to 30% relative to the polymer.

The suspensions are prepared by mixing the components under moderate agitation for several minutes. It is preferable to first mix the surfactant and the water, then to disperse the powdered polymer in this mixture. As an alternative, the polymer may be dispersed in the suspension, then the required quantity of water added under agitation.

The suspensions according to the invention are storage-stable at temperatures ranging from −5° C. to +50° C. They disperse easily in water under slight agitation, such that the polymer may be in the form of aqueous solutions that are diluted rapidly without using any powerful method of agitation. In addition, the presence of the water-soluble surfactant very substantially reduces the surface tension of the aqueous polymer solution and provides a considerable advantage in a number of industrial applications. Due to these advantageous properties, the water-soluble polymer solutions according to the invention are particularly well suited for use in oilfields and for preparing aqueous solutions designed for assisted oil recovery.

In order to further illustrate the present invention and the advantages thereof, the following specific examples are given, it being understood that same are intended only as illustrative and in nowise limitative.

In said examples to follow, the following technique was used for preparing the suspension.

The surfactant and water were placed in suitable receptacle in the proportions indicated. Agitation was applied to obtain a homogenous solution. The polymer in powder form was then rapidly added, then mixed for several minutes until a homogenous mixture was obtained.

The viscosity of the suspension was measured after same had been maintained at rest for 10 minutes.

EXAMPLE 1

Suspensions were prepared from a Xanthan gum base and various surfactants.

The Xanthan gum employed is marketed by RHONE-POULENC under the trademark Rhodopol 23.

| Dimensions of particles: | <200 μm | 77.5% |
|---|---|---|
| | between 200–500 μm | 14% |
| | >250 μm | 8.5% |

The characteristics of the surfactants employed were as follows:
(i) Nonylphenol 9 OE: condensate of nonylphenol with 9 moles of ethylene oxide (trademark: Cemulsol NP9);
(ii) Octylphenol 16 OE: condensate of octylphenol with 16 moles of ethylene oxide (trademark: Cemulsol OP 16);
(iii) Alfol 12-14 9 OE: mixture of linear $C_{12}$–$C_{14}$ alcohols condensed with 9 moles of ethylene oxide (trademark: Cemulsol L.A. 90);
(iv) OXO, OE-OP alcohols: condensate of ethylene oxide and propylene oxide with OXO alcohols (trademark: Cemulsol FM 53);
(v) Nonylphenol phosphate 9 OE: Nonylphenol monoacid phosphate potassium salt condensed with 9 moles of ethylene oxide, containing 20% water (trademark: Celanol PS 19).

The formulations and results of the measurements of viscosity and stability of the suspensions are reported in Table I. For the formulations, the quantities indicated are expressed in grams of product. Formulae 1 and 2 are provided for purposes of comparison.

TABLE I

| Formulation | 1 | 2 | 3 | 4 | 5 | 6 | 7 | 8 |
|---|---|---|---|---|---|---|---|---|
| Xanthan gum | 50 | 50 | 50 | 43 | 47 | 45.5 | 45.5 | 40 |
| Nonylphenol 9 OE | 50 | | 50 | 57 | 42 | | | |
| Octylphenol 16 OE | | 50 | | | | | | |
| Alfol 12-14 9 OE | | | | | | 45.5 | | |
| Alcohol OXO OE, OP | | | | | | | 43 | |
| Nonylphenol phosphate | | | | | | | | 50 |

TABLE I-continued

| Formulation | 1 | 2 | 3 | 4 | 5 | 6 | 7 | 8 |
|---|---|---|---|---|---|---|---|---|
| Water | 0 | 0 | 10 | 17 | 11 | 11 | 11 | — |
| Viscosity* mPa · s. | 8000 | 19,000 | 16,200 | 7500 | 9500 | 4600 | | 13,700 |
| Stability: | | | | | | | | |
| 24 h @ 20° C. | sed.** | good | good | good | good | good | good | good |
| 24 h @ 50° C. | sed.** | sed.** | good | good | good | good | good | good |

*Brookfield viscosimeter, Model LTV, 6 rpm, plunger No. 4, 20° C.
**Sedimentation

EXAMPLE 2

The polymer used was Xanthan gum (Rhodopol 23) and the surfactant was polyoxyethylenated nonylphenol (Cemulsol NP 9). The concentration of polymer and water content of the suspension were varied.

The results of the viscosity measurements are reported in Table II.

TABLE II

| Quantities in g. | | | Suspension Viscosity in mPa · s* |
|---|---|---|---|
| Xanthan gum | Surfactant | Water | |
| 25 | 20 | 2 | 20,200 |
| 20 | 20 | 5.5 | 11,400 |
| 16 | 20 | 6 | 13,500 |
| 12 | 20 | 8 | 6,800 |
| 12 | 20 | 9.5 | 20,600 |

*Brookfield Model LVT viscosimeter; 6 rpm; No. 4 plunger; at 20° C.

After 24 hours at rest at ambient temperature, the viscosity values did not change.

EXAMPLE 3

In this example, an acrylamide and acrylic acid copolymer (Flocogil AD 37) was used, with a molecular weight of $6\text{-}8 \cdot 10^6$. Its granulometry was the following:

| Particle dimensions: | >500 μm | 45% |
|---|---|---|
| | 400–500 μm | 15% |
| | 250–400 μm | 40% |

Characteristics of surfactants employed:
(i) Copra amine 20 OE: copra amine condensed with 20 moles of ethylene oxide;
(ii) Copra amine 10 OE: opra amine condensed with 10 moles of ethylene oxide;
(iii) Nonylphenol 9 OE: (Cemulsol NP 9).

The results are reported in Table III. Formulations 1 and 2 are provided as examples for purposes of comparison

TABLE III

| Formulation | 1 | 2 | 3 | 4 |
|---|---|---|---|---|
| Polyacrylamide | 50 | 50 | 50 | 48.2 |
| Copra amine 20 OE | 50 | | | |
| Copra amine 10 OE | | 50 | 50 | |
| Nonylphenol 9 OE | | | | 48.2 |
| Water | | | 5 | 3.6 |
| Viscosity in mPa · s* | 10,400 | 3600 | 5700 | 4700 |
| Stability, 24 hours at 50° C. | separation | separation | good | good |

*Brookfield viscosimeter; Model LVT; 6 rpm; No. 4 plunger @ 20° C.

EXAMPLE 4

Suspensions were prepared using the following natural gums:

(i) Sodium alginate;
(ii) Guar Gum: trademark, Vidogum GH 75; and
(iii) Carboxymethylcellulose: trademark, Blanose 7L2

As the surfactant, a condensate of ethylene oxide and propylene oxide with OXO alcohol (Cemulsol FM 53) was used.

The formulations and viscosity measurements of the suspensions are reported in Table IV. Quantities are expressed in grams of product.

TABLE IV

| Polymer | Weight in g. | Surfactant weight in g. | Water Weight in g. | Viscosity mPa · s* |
|---|---|---|---|---|
| Sodium Alginate | 43 | 45.15 | 11.85 | 6,200 |
| Guar gum | 43.5 | 50 | 6.5 | 5,900 |
| Carboxymethylcellulose | 50 | 42 | 8 | 7,100 |

*Brookfield viscosimeter, Model LVT; 6 rpm; No. 4 plunger @ 20° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A storage-stable, pumpable, concentrated polymer suspension, comprising a suspension of (i) a particulate water-soluble polymer, in (ii) at least one water-soluble fluid surfactant having an HLB greater or equal to 10, and (iii) water, the amount of water being less than about 30% by weight of the total weight of said suspension, and the ratio by weight of said polymer (i) to said surfactant (ii) ranging from 20–90/80–10.

2. The concentrated suspension as defined by claim 1, comprising from 20 to 75% by weight of said water-soluble polymer (i).

3. The concentrated suspension as defined by claim 2, said ratio ranging from 30–70/70–30.

4. The concentrated suspension as defined by claim 3, said ratio ranging from 40–55/60–45.

5. The concentrated suspension as defined by claim 2, the amount of water (iii) being less than about 15% by weight of the total weight of said suspension.

6. The concentrated suspension as defined by claim 2, said water-soluble polymer (i) comprising an acrylic or methacrylic homopolymer or copolymer.

7. The concentrated suspension as defined by claim 2, said water-soluble polymer (i) comprising natural gum or modified natural gum.

8. The concentrated suspension as defined by claim 7, said water-soluble polymer (i) comprising a natural gum polysaccharide of microbial origin.

9. The concentrated suspension as defined by claim 8, said water-soluble polymer (i) comprising Xanthan gum.

10. The concentrated suspension as defined by claim 2, said water-soluble polymer (i) comprising an acrylamide or methacrylamide polymer.

11. The concentrated suspension as defined by claim 2, said surfactant (ii) comprising a non-ionic surfactant.

12. The concentrated suspension as defined by claim 11, said surfactant (ii) comprising a polyoxyethylenated aliphatic alcohol or alkylphenol.

13. The concentrated suspension as defined by claim 2, said surfactant (ii) comprising an anionic surfactant.

14. The concentrated suspension as defined by claim 2, said surfactant (ii) comprising a cationic surfactant.

15. The concentrated suspension as defined by claim 2, said surfactant (ii) comprising an amphoteric surfactant.

16. The concentrated suspension as defined by claim 2, said surfactant (ii) being polymer inert, wettable, and having an HLB value of at least 10.

17. In a process for the thickening or flocculating of a liquid medium, the improvement which comprises utilizing as the thickening or flocculating agent therefor, the concentrated suspension as defined by claim 1.

* * * * *